United States Patent [19]

Fakhruddin et al.

[11] Patent Number: 5,394,527
[45] Date of Patent: Feb. 28, 1995

[54] METHOD AND APPARATUS FACILITATING USE OF A HARD DISK DRIVE IN A COMPUTER SYSTEM HAVING SUSPEND/RESUME CAPABILITY

[75] Inventors: Saifuddin T. Fakhruddin, St. Joseph; Mark J. Foster, Lincoln Township, Berrien County; Scott A. Hovey, St. Joseph; James L. Walker, Benton Harbor; Randy J. Vanderheyden, St. Joseph Township, Berrien County, all of Mich.

[73] Assignee: Zenith Data Systems Corporation, Buffalo Grove, Ill.

[21] Appl. No.: 143,457

[22] Filed: Oct. 26, 1993

Related U.S. Application Data

[62] Division of Ser. No. 703,026, May 17, 1991.

[51] Int. Cl.$^6$ ............................................. G06F 3/00
[52] U.S. Cl. ............................ 395/275; 364/DIG. 1; 364/248.1; 364/263.2; 364/273.1
[58] Field of Search ................. 395/275, 375, 750, 725

[56] References Cited

U.S. PATENT DOCUMENTS

| | | |
|---|---|---|
| 4,294,496 | 10/1981 | Murez . |
| 4,317,180 | 2/1982 | Lies . |
| 4,381,552 | 4/1983 | Nocilini et al. . |
| 4,458,307 | 7/1984 | McAnlis et al. . |
| 4,461,003 | 7/1984 | Tamaki . |
| 4,506,323 | 3/1985 | Pusic et al. . |
| 4,523,295 | 6/1985 | Zato . |
| 4,564,751 | 1/1986 | Alley et al. . |
| 4,626,986 | 12/1986 | Mori . |
| 4,646,307 | 2/1987 | Nishimura . |
| 4,658,352 | 4/1987 | Nagasawa . |
| 4,674,089 | 6/1987 | Poret et al. . |
| 4,689,761 | 8/1987 | Yurchenco . |
| 4,694,393 | 9/1987 | Hirano et al. . |
| 4,698,748 | 10/1987 | Juzswik et al. . |
| 4,734,851 | 3/1988 | Director ............................ 364/200 |
| 4,757,505 | 7/1988 | Marrington et al. . |
| 4,763,333 | 8/1988 | Byrd . |
| 4,782,468 | 11/1988 | Jones et al. . |
| 4,823,292 | 4/1989 | Hillion . |
| 4,839,837 | 6/1989 | Chang . |
| 4,868,832 | 9/1989 | Marrington et al. . |
| 4,870,570 | 9/1989 | Satoh et al. . |
| 4,907,150 | 3/1990 | Arroyo et al. . |
| 4,933,785 | 6/1990 | Moreehouse et al. . |
| 4,945,335 | 7/1990 | Kimura et al. . |

(List continued on next page.)

FOREIGN PATENT DOCUMENTS 53-22345 3/1978 Japan .

OTHER PUBLICATIONS

Microsoft, MS-DOS, User's Guide, 1986, Title Pages and p. 245.

IBM System/360 Principles of Operation, Eighth Edition (Sep., 1968) Title Pages and pp. 68–83.

Clements, Alan; "Microprocessor Systems Design", 1987, Title pages and pp. 117, 246, 353, 354, PWS-Kent Publishing Company, Boston.

Toshiba T1600 "User's Manual" 2d ed.; Title page, pp. 2-1 to 2-3, and pp. 2-8 to 2-11; 1987.

*Primary Examiner*—Gareth D. Shaw
*Assistant Examiner*—Kakali Chaki
*Attorney, Agent, or Firm*—T. Murray Smith; Charles W. MacKinnon; Scott B. Dunbar

[57] ABSTRACT

A computer system has a processing unit with suspend/resume capability, a memory, and a hard disk drive. In response to a first command from the processor, the hard disk drive sends its status to the processor and the processor stores it in the memory. In response to a second command from the processor, the hard disk accepts from the processor the status retrieved by the processor from the memory, and restores itself to this status. In an alternative embodiment, the hard disk drive response to the first command by storing its status on its own hard disk, and responds to the second command by restoring this status from the hard disk. In each case, an output line from the hard disk used to control a light emitting diode is also selectively used to create an interrupt to the processor which facilitates the systems entry into the suspend mode.

7 Claims, 8 Drawing Sheets

U.S. PATENT DOCUMENTS

| | | |
|---|---|---|
| 4,980,836 | 12/1990 | Carter et al. . |
| 4,991,129 | 2/1991 | Swartz . |
| 5,014,193 | 5/1991 | Garner et al. . |
| 5,021,983 | 6/1991 | Nguyen et al. . |
| 5,027,273 | 6/1991 | Letwin . |
| 5,027,294 | 6/1991 | Fakruddin et al. . |
| 5,068,652 | 11/1991 | Kobayashi . |
| 5,077,551 | 12/1991 | Saitou . |
| 5,083,266 | 1/1992 | Watanabe ............... 395/275 |
| 5,086,387 | 2/1992 | Arroyo et al. . |
| 5,129,091 | 7/1992 | Yorimoto et al. . |
| 5,142,684 | 8/1992 | Perry et al. . |
| 5,155,840 | 10/1992 | Niijima . |
| 5,163,153 | 11/1992 | Cole et al. . |
| 5,167,024 | 11/1992 | Smith et al. ............ 395/375 |
| 5,167,024 | 11/1992 | Smith et al. . |
| 5,175,845 | 12/1992 | Little . |
| 5,175,853 | 12/1992 | Kardach et al. . |
| 5,182,810 | 1/1993 | Bartling et al. . |
| 5,189,647 | 2/1993 | Suzuki et al. . |
| 5,214,762 | 5/1993 | Bush et al. ............. 395/275 |
| 5,218,704 | 6/1993 | Watts, Jr. et al. . |
| 5,230,074 | 7/1993 | Canova et al. ......... 395/750 |
| 5,237,692 | 8/1993 | Raasch et al. .......... 395/725 |
| 5,241,680 | 8/1993 | Cole et al. ............. 395/750 |
| 5,254,888 | 10/1993 | Lee et al. . |

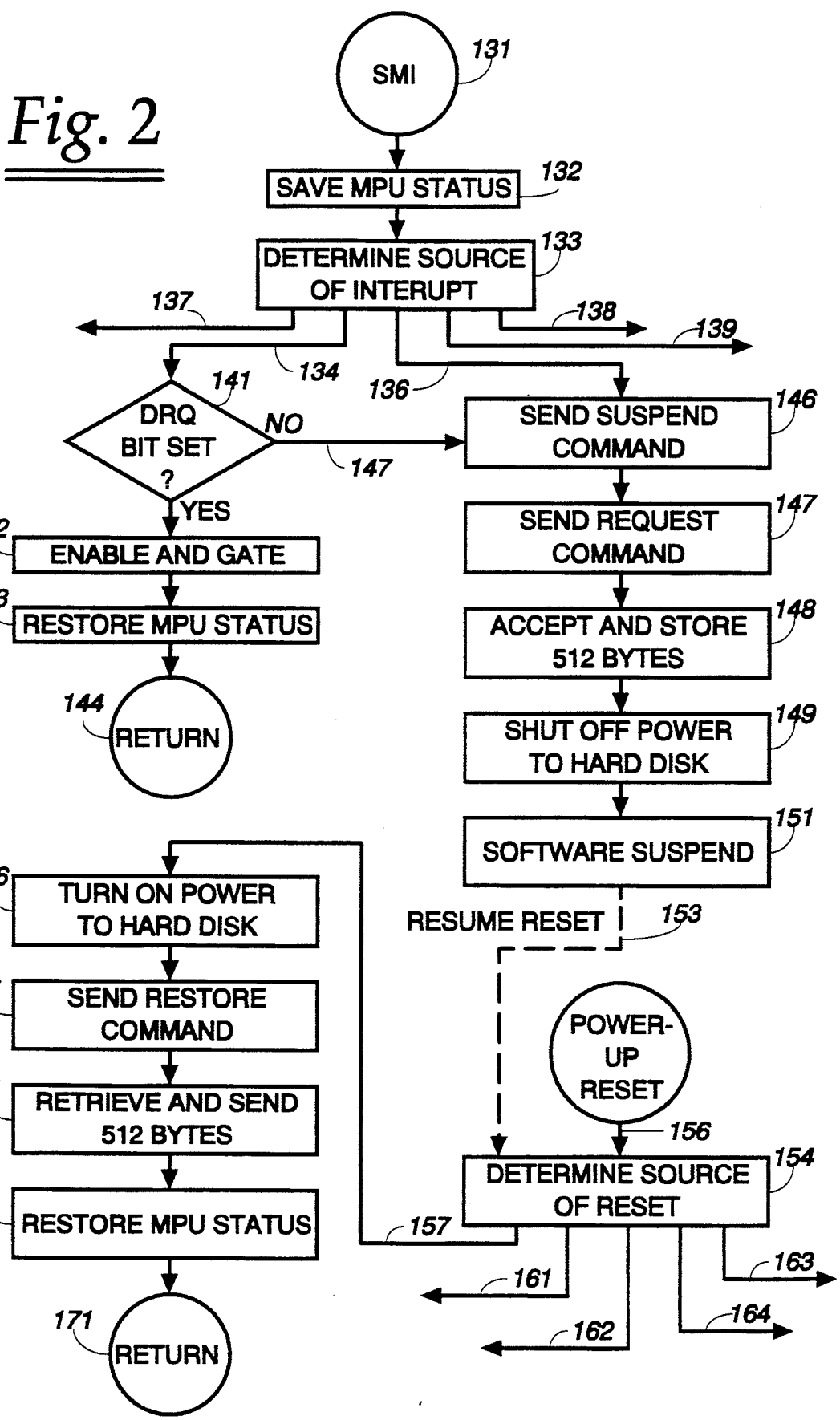

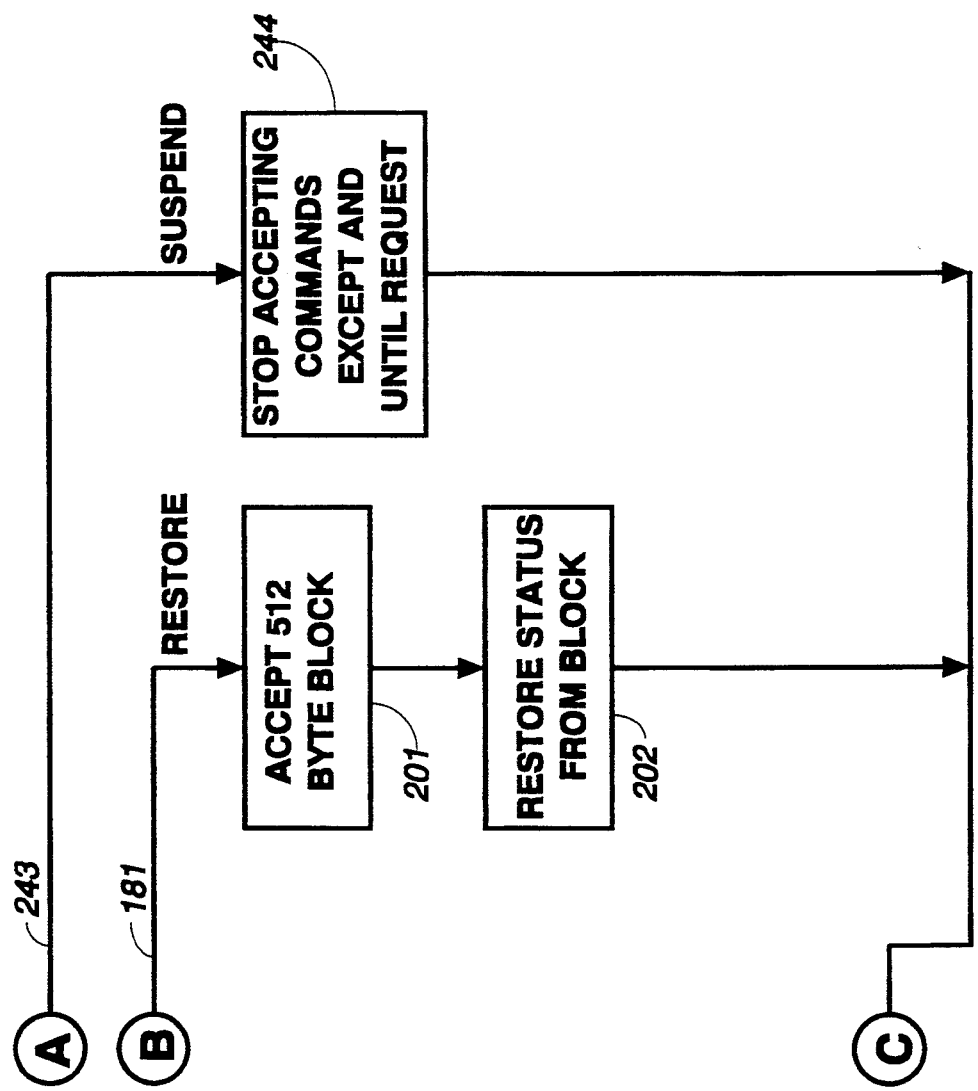

METHOD AND APPARATUS FACILITATING USE OF A HARD DISK DRIVE IN A COMPUTER SYSTEM HAVING SUSPEND/RESUME CAPABILITY

This is a division of Ser. No. 07/703,026, filed May 17, 1991.

FIELD OF THE INVENTION

This invention relates generally to a computer system with suspend/resume capability and, more particularly, to a method and apparatus facilitating use of a hard disk drive with such a computer system.

BACKGROUND OF THE INVENTION

When the power is turned off in most pre-existing computer systems, the current status of the system is entirely lost. Consequently, when the power is turned back on, the particular application program to be run must usually be manually selected and loaded. Some preexisting computers, however, have a feature known as suspend/resume capability, which permits the entire operational status of the processing unit to be saved when the power is turned off and to be restored when the power is turned back on, so that the user automatically finds himself in precisely the same application program and at precisely the same point on the same screen as when the power was turned off.

Commercially available hard disk drives can often be selectively programmed in different ways. For example, there are hard disk drives which can be programmed to a multiple mode setting which allows data transfer to occur in multiple sector blocks with only one interrupt at the end of the block. Also, there are drives which can be given a predetermined time value and, whenever this time period elapses without an access to the drive, the drive automatically stops its motor, and does not start the motor again until a further access occurs. Moreover, there are hard disk drives which can be configured for a specific number of tracks per disk, sectors per track and number of heads. In a commercially available drive, these features are initialized by sending commands/data to the drive, but the drive usually does not provide any way for the system to subsequently obtain from the drive an indication of how these features have been set. It is assumed that the operating system already knows how it has set these features.

In order to use a hard disk of this type with a system having suspend/resume capability, and since the electronic circuitry in the drive will forget its current status during the suspend operation because of the fact that power to the drive circuitry is turned off, it is important that the exact status of the hard disk drive prior to the suspend operation be stored before the suspend, and that this status be restored in the hard disk drive when operation subsequently resumes. Otherwise, the hard disk drive will operate differently after the suspend operation than it did before the suspend operation, which in turn may cause the application program to operate differently and/or improperly, which would obviously defeat the entire purpose of the suspend/resume capability.

Consequently, it is important for the hardware of a computer system (including the firmware in read only memory) to be designed so that it maintains externally of the hard disk drive a record of the specific settings to which the drive has been programmed. Thus, in a traditional system of the IBM compatible type, the firmware program commonly referred to as the basic input/output system (BIOS) would maintain this external record of the disk settings. So long as the operating system communicated with the disk drive only through the routines of the BIOS, the BIOS could maintain this record with no difficulty whatsoever. However, there are commercially available operating systems such as OS/2 and UNIX, which bypass the BIOS routines and directly set perimeters in the hard disk drive. When the BIOS is bypassed, it obviously cannot maintain an accurate record of the specific settings programmed in the hard disk drive. Therefore, if such a system is to be placed in suspend mode at a point in time where a program such as OS/2 or UNIX has been running, the firmware routines which guide the system into suspend mode will not have an accurate record from the BIOS of the settings which have been programmed into the hard disk drive and, as mentioned above, these routines cannot obtain the same information directly from the drive itself. Consequently, a system which implements suspend/resume capability and uses a conventional hard disk drive cannot guarantee proper operation with certain pre-existing programs such as OS/2 and UNIX. On the other hand, it is desirably to avoid the design of a new hard disk drive which would permit proper operation of OS/2 and UNIX in a system with suspend/resume capability, but which is incompatible with existing interface and cabling standards.

It is therefore an object of the present invention to provide a method and apparatus facilitating use of a hard disk drive in a computer system with suspend/resume capability so as to maintain compatibility with preexisting programs, while simultaneously maintaining compatibility with existing interface and cabling standards.

It is a further object of the present invention to provide such a system in which the disk drive facilitates saving and restoring of its current status.

It is a further object of the invention to provide such an apparatus which involves little or no redesign of the circuitry of a hard disk drive and associated cabling, so that the disk drive has a cost comparable to that of pre-existing drives.

BRIEF DESCRIPTION OF THE DRAWINGS

Preferred embodiments of the present invention will be described in detail hereinafter with reference to the accompanying drawings, in which:

FIG. 2 is a flowchart of pertinent portions of an interrupt service routine executed by a processor which is a component of the system of FIG. 1;

DETAILED DESCRIPTION

Figure 1A:
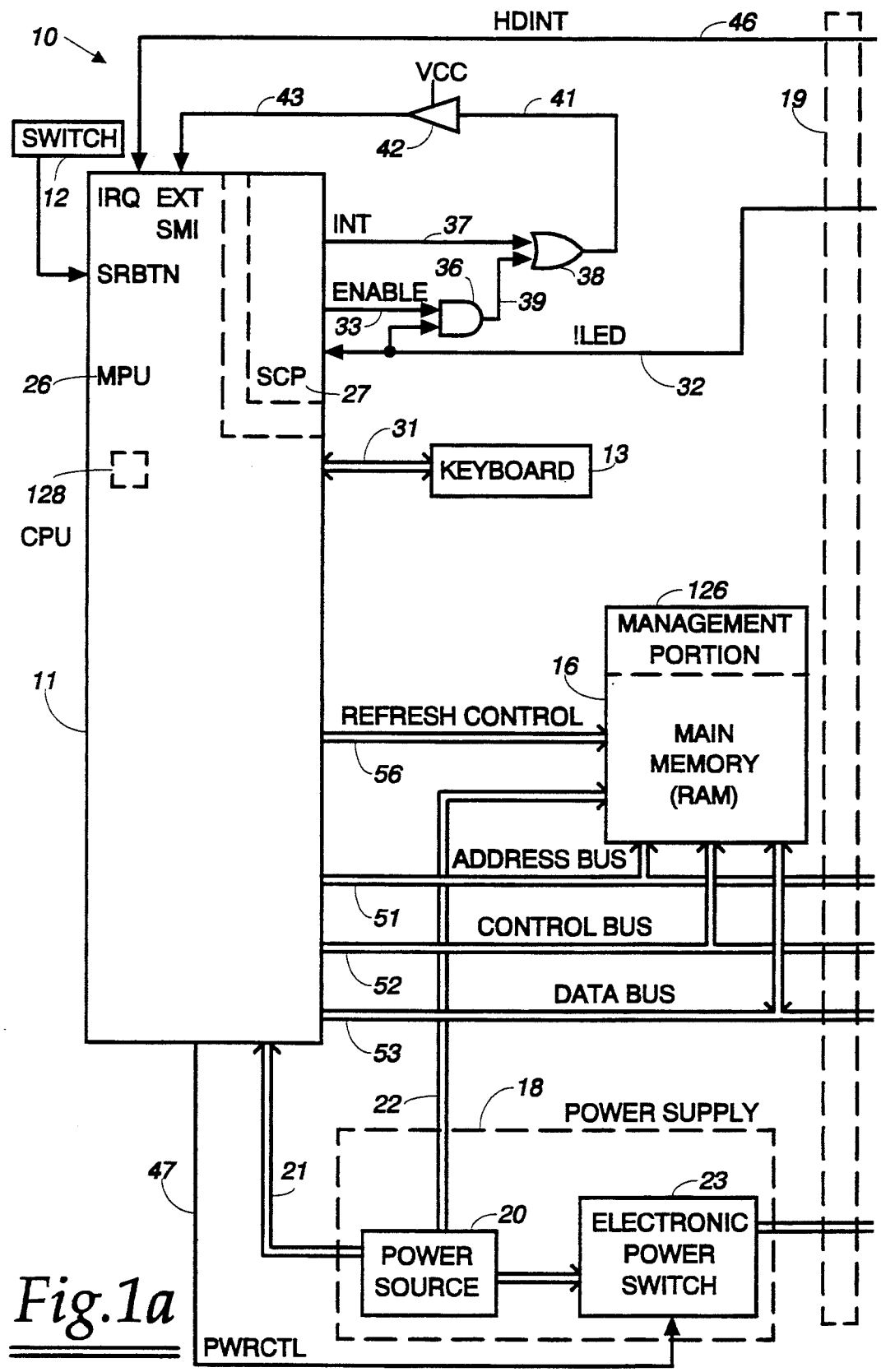
FIG. 1 is a block diagram of a computer system which has a hard disk drive and suspend/resume capability, and which embodies the present invention.
Figure 1B:
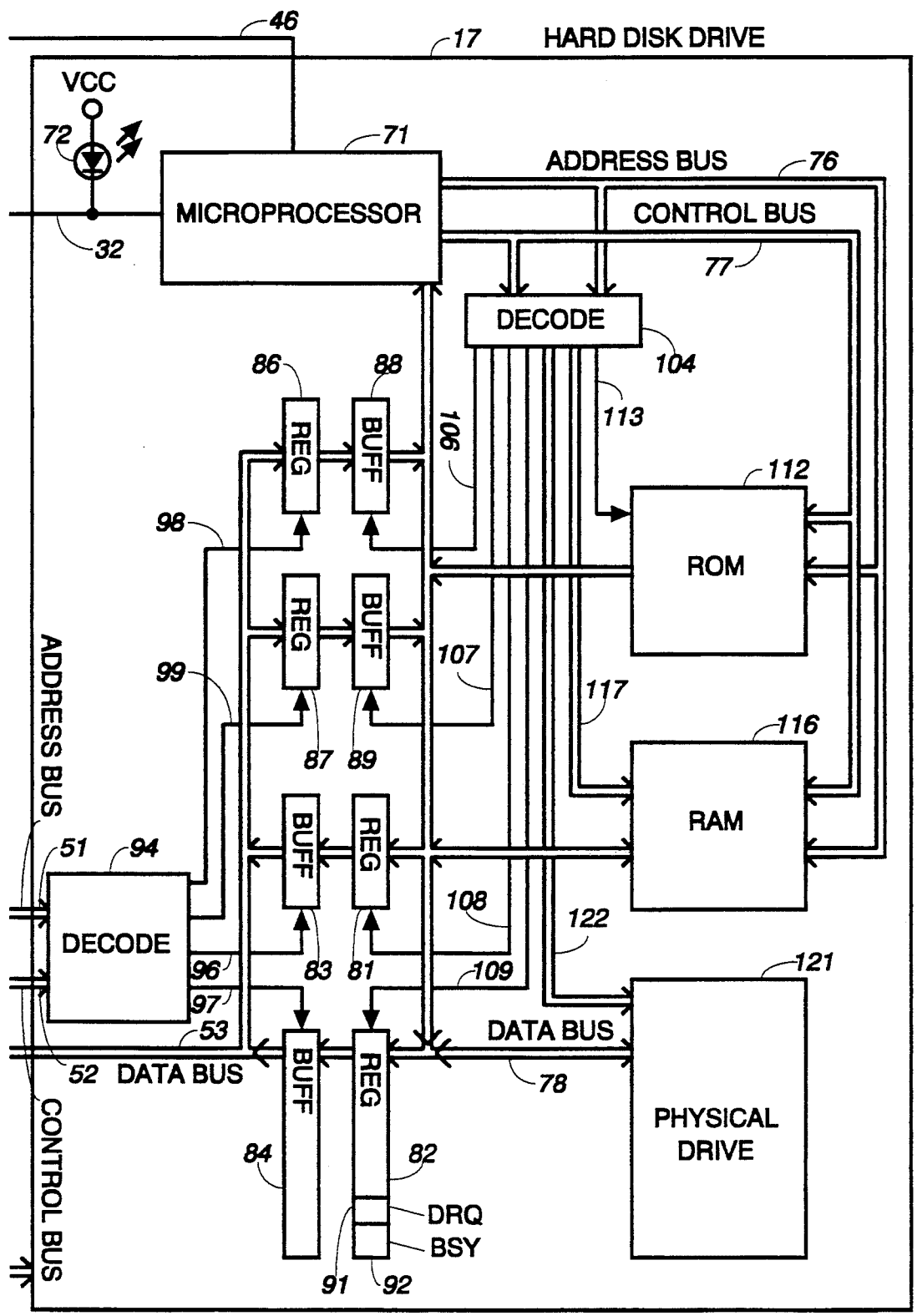

Referring to FIG. 1, a computer system 10 includes a central processing unit (CPU) 11, a push-button switch.

12 which is coupled to the CPU 11, a conventional computer keyboard 13, a main memory 16, a hard disk drive 17 and a power supply 18. The hard disk drive 17 is electrically coupled to the rest of the system 10 through one or more cables, which in the preferred embodiment are conventional and are collectively represented in a diagrammatic form at 19.

The power supply 18 includes a power source 20 which is a rechargeable battery in the preferred embodiment, and which supplies DC power to the CPU 11 at 21, to the main memory 16 at 22, and to the hard disk drive 17 through a selectively actuable electronic power switch 23.

In the preferred embodiment, the CPU 11 includes two separate microprocessors, namely a main processing unit (MPU) 26 and a system control processor (SCP) 27. The SCP 27 is provided to take some of the processing burden off the MPU 26, and persons of ordinary skill in the art will recognize that the SCP could in fact be omitted and that the MPU 26 could perform all processing functions of the CPU 11. Of course, the system operates faster and more efficiently when both the MPU 26 and SCP 27 are present.

The MPU 26 is, in the preferred embodiment, an Intel 80386 SL microprocessor manufactured by Intel Corporation of Santa Clara, Calif., along with typical associated support circuitry. This particular microprocessor has some special features which will be discussed in more detail later. The SCP 27 could be implemented with almost any conventional and commercially available microprocessor and its associated support circuits.

The keyboard 13 is entirely conventional, and is coupled through a conventional cable 31 to the SCP 27. The SCP 27 also receives from the hard disk drive on a line 32 a signal !LED, which will be described in more detail later. The exclamation point (!) in front of the signal name indicates that the signal is active low. The SCP 27 produces an output signal ENABLE on a line 33, which is coupled to one input of a two-input AND gate 36, the other input of which is coupled to the line 32 from the hard disk drive which carries the signal !LED. The SCP 27 also outputs a signal INT on a line 37, which is coupled to one input of a two-input OR gate 38, the other input of which is coupled to the output 39 of the AND gate 36. The output 41 of the OR gate 38 is coupled to the input of a three-state buffer 42, which is always actuated. The output 43 from the three-state buffer 42 is connected to an interrupt input EX-TSMI of the MPU 26. The line 32 is already present in conventional cables of the type shown diagrammatically at 19, and thus use of this line to create an interrupt according to the present invention avoids the expense and inconvenience of non-standard cabling while ensuring that the cabling and disk drive both remain fully compatible with pre-existing systems.

An interrupt signal HDINT supplied by the hard disk 17 on a line 46 is coupled to a further interrupt input IRQ of the MPU 26.

The MPU 26 produces on an output line 47 a power control signal PWRCTL, which is connected to a control input of the electronic power switch 23. When the signal PWRCTL is in respective logical states, the electronic power switch 23 respectively permits and prevents the application of DC power to the hard disk drive 17. The MPU 26 outputs address and control data on respective buses 51 and 52, and sends and receives data on a bidirectional data bus 53. The address bus 51, control bus 52 and data bus 53 are coupled to the main memory 16 and to the hard disk drive 17. The MPU 26 also provides refresh control signals 56 for the main memory 16, which in the preferred embodiment is implemented with dynamic random access memory components (DRAM).

The internal structure of the hard disk drive 17 shown in FIG. 1 is exemplary, and there are variations of it which are compatible with the present invention. In FIG. 1, the hard disk drive 17 includes a microprocessor 71, which could be almost any conventional and commercially available microprocessor. The microprocessor 71 generates the previously mentioned !LED signal on line 32 and the HDINT signal on line 46. The hard disk drive 17 includes an LED 72, which is connected between the line 32 and a source of power. Thus, when the line 32 carries a logic low voltage, the LED 72 will be illuminated, whereas when the line 32 carries a logic high voltage, the LED 72 will not be illuminated. The LED 72 is used to provide a visual indication of when the hard disk drive 17 is carrying out a command.

The microprocessor 71 generates address and control signals on respective address and control buses 76 and 77, and sends and receives data on a bidirectional data bus 78. The data bus 78 is connected to inputs of an eight-bit register 81 and an eight-bit register 82, and outputs of these registers are connected through respective three-state buffers 83 and 84 to the system data bus 53. The system data bus 53 is connected to inputs of an eight-bit register 86 and an eight-bit register 7, and the outputs of these registers are coupled through respective three-state buffers 88 and 89 to the disk data bus 78. The register 82 includes a DRQ bit 91 and a BSY bit 92, which will be discussed in more detail later.

The system address and control buses 51 and 52 are connected to a decoding circuit 94 of a conventional type. The decoding circuit 94 has four outputs 96–99, and can selectively actuate one of these outputs in response to respective predetermined combinations of signals on the address bus 51 and control bus 52. When actuated, the output 97 enables the three-state buffer 84 so that the contents of register 82 are placed on the system data bus 53. When output 96 is enabled, the three-state buffer 83 is enabled so that the contents of register 81 are placed on the system data bus 53. When output 99 is actuated, the data present on system data bus 53 is loaded into the register 87, and when output 98 is enabled, the data on the system data bus 53 is loaded into the register 86.

Associated with the microprocessor 71 is a similar decode circuit 104 of a conventional type. The decode circuit 104 has several outputs, including four outputs 106–109. When the output 106 is actuated, it enables the three-state buffer 88 so that the contents of register 86 are placed onto the disk data bus 78. When the output 107 is actuated, it enables the three-state buffer 89 so that the contents of register 87 are placed onto the disk data bus 78. When the output 108 is actuated, the data on disk data bus 78 is loaded into the register 81, and when the output 109 is actuated, the data on disk data bus 78 is loaded into register 82.

The hard disk drive 17 also includes a read only memory (ROM) 112, which is coupled to the address, control and data buses 76–78, and which can be selected by an output 113 from the decode circuit 104. The ROM 112 contains a program which is executed by the microprocessor 71, along with some data constants which are used by the program. The hard disk drive 17 further includes a random access memory (RAM) 116, which is coupled to the address, control and data buses 76-78 and to select lines 117 from the decode circuit 104. The microprocessor 71 can dynamically store data in and retrieve data from the RAM 116 while it is executing the program provided in the ROM 112. The data bus 78 and some select lines 122 from the decode circuit 104 are connected to a physical drive section 121. The physical drive section 121 includes conventional and not-illustrated components such as one or more rotating magnetic platters, one or more movable read/write heads each engageable with a platter surface, a mechanism for moving each head relative to its platter, and the electrical support circuitry for each head.

The CPU 11 uses the register 86 to send commands to the disk drive 17, and uses the register 87 to pass data to the disk drive 17. The disk drive 17 uses the register 81 to pass data to the CPU 11, and maintains in the register 82 certain status information, such as the DRQ bit 91 which is set when the disk drive 17 is carrying out a command and the BSY bit 92 which can be repeatedly set and reset as a command is carried out to provide handshaking information which facilitates a transfer of data between the CPU 11 and disk drive 17. The !LED line 32 is set to a logic low voltage at the start of a command to turn on the LED 72, and is switched back to a logic high voltage when the command concludes, as described in more detail later. The HDINT signal is used during execution of commands to interrupt the application program in the CPU 11, for example to effect the transfer of each of several blocks of data between the CPU 11 and the hard disk drive 17.

The present invention involves changes to the program stored in the ROM 112 but, aside from this, the hard disk drive 17 is structurally conventional in all respects.

As mentioned above, the main processing unit (MPU) 26 has some special features. These features are inherent and integral to the commercially available microprocessor used for the MPU 26, and are not in and of themselves the focus of the present invention. Nevertheless, these special features are briefly described here in order to facilitate a thorough and accurate understanding of the present invention.

More specifically, it is important to understand that the MPU 26 is a protected mode microprocessor. When operating in the protected mode, the MPU 26 typically does not have unrestricted control of the system. As a specific example, the main memory 16 might at some specific point in time include a multi-tasking operating system such as OS/2 or UNIX, a first application program such as a word processor, and a second application program such as a spreadsheet. When the operating system turns control of the MPU 26 over to the first application program, it would place the MPU 26 in a protected mode which prevents the MPU 26 from changing some of its own internal registers which control protected mode and from changing portions of the main memory 16 which contain the operating system and the second application program. Similarly, as the operating system is turning the MPU 26 over to the second applications program, it places the MPU 26 in a protected mode which prevents the second application program from doing certain things such as changing the internal registers of the MPU which control protected mode or changing the portions of main memory 16 storing the operating system and the first application program.

Another special feature is that the MPU 26 has, in addition to a standard interrupt handling structure which can be triggered by an event such as actuation of the IRQ input by a signal on line 46, a special service management interrupt which can be triggered by manual actuation of the push-button switch 12 or by actuation of the EXTSMI input by the signal on line 43. Upon the occurrence of a service management interrupt, the internal hardware of the MPU 26 automatically stores in a special reserved management portion 126 of the main memory 16 every facet of the current operational state of the MPU, including all internal registers and flags. The MPU 26 is then automatically placed in a non-protected operational mode, and begins execution of a special service management interrupt handling routine provided in the management portion 126 of the main memory 16. Thus, if the MPU 26 is operating in protected mode for a particular application at the point in time when it is interrupted, the entire status of the MPU at the time of the interrupt is saved, including the existence of the protected mode, the special handling routine for the interrupt is then executed in non-protected or "real" mode, and then as control is returned to the interrupted application program the entire stored status of the MPU, including the existence of protected mode, is restored. Thus, the handling of the interrupt is invisible to the application program and does not affect the status of its protected mode, but during the special handling routine the MPU operates in real mode without the limitations of the application program's protected mode, and thus has virtually unrestricted access to the system in order to carry out its pertinent task.

A further special feature of the MPU 26 is that it has a status bit shown diagrammatically at 128 and a special software instruction which, when executed, causes the MPU 26 to enter a suspend state in which it halts and internally shuts off power to almost all of its circuitry, except for a few portions such as the portion which generates the refresh control signals 56. When the push-button switch 12 is manually deactuated while the MPU 26 is in this suspend state, the MPU 26 automatically turns all of its internal power back on, sets the status bit 128 to indicate that it has been in the suspend state, and then initiates a self-reset which does not affect the status bit 128 but is otherwise similar to the manner in which the MPU 26 responds to a system reset generated externally to itself. When the hardware transfers control to a software routine at a predetermined address following each such reset, the software routine can check the status bit 128 to see whether or not the reset was caused by an exit from the suspend state. It is emphasized again that the special features of the MPU 26 discussed above are inherent and integral to the commercially available microprocessor used for the MPU 26, namely the Intel 80386 SL microprocessor. Therefore, these features have been only briefly described for purposes of convenience.

As mentioned above, the management portion 126 of the main memory 16 includes a special interrupt handling routine for the service management interrupt. FIG. 2 is a flowchart showing portions of this interrupt handling routine which embody features of the present invention.

More specifically, at the top of FIG. 2, block 131 indicates the occurrence of a service management interrupt, for example due to actuation of the switch 12, due to actuation of the line 43, or due to the occurrence of some other condition. As mentioned above, the occurrence of this interrupt causes the hardware of the MPU 26 to automatically save the entire current status of the MPU in the management portion 126 of the main memory 16, including all internal registers and status flags. Although this is performed by the hardware and is technically not a part of the software interrupt handling routine, it is shown in block 132 of FIG. 2 for clarity and in order to facilitate an understanding of the present invention. Control is then transferred to the software interrupt handling routine in the portion 126 of the main memory, beginning with block 133 of FIG. 2. In block 133, the handling routine checks certain status flags in order to determine the source of the interrupt, or in other words whether it was caused by actuation of the switch 12, actuation of the line 43, or some other event. If it was caused by actuation of the switch 12 or by actuation of the line 43, then control proceeds as respectively shown at 134 or 136, whereas if the cause was some other event control proceeds as shown at 136-139 to respective routines which are not pertinent to the present invention and are thus not illustrated or described.

Assuming that the interrupt was caused by manual actuation of the switch 12, which indicates that the system is to be placed in the suspend mode, control proceeds at 134 to block 141, where the MPU 26 reads the contents of the status register 82 in the hard disk drive 17 and checks the DRQ bit 91. If the DRQ bit is set, then the hard disk drive 17 is in the middle or carrying out an operation which the interrupted application program initiated before it was interrupted, and thus the MPU 26 must wait until the operation is completed before the MPU can shut down the hard disk drive 17 in order to implement the suspend mode. In this case, the MPU 26 proceeds to block 142, where it directs the SCP 27 to actuate its enable output line 33, which enables the AND gate 36. Since the hard disk drive 17 is in the middle of an operation, its microprocessor 71 will be maintaining the line 32 at a logic low level in order to illuminate the LED 72, and thus the other input of AND gate 36 will be disabled. Then, at block 143 and 44, control is returned to the interrupted application program, block 143 representing the automatic restoration by the MPU hardware of the status which was stored in portion 126 of main memory 16 at block 132 of FIG. 2. Like block 132, block 143 is included in the flowchart of FIG. 2 for clarity, even though it is technically performed by the MPU hardware rather than by software of the interrupt service routine. Since control has now been returned to the interrupted application program, the application program continues to execute while the hard disk drive 17 completes the operation which is in progress.

When the hard disk drive 17 completes the operation in progress, it switches the line 32 to a logic high level to turn off the LED 72, as a result of which both inputs of the AND gate 36 will be at a logic high level, and thus the output 39 of the AND gate 36 will be actuated and in turn will actuate one input of the OR gate 38, causing the OR gate 38 to actuate its output 41 and thus the line 43 so that another service management interrupt is generated at the EXTSMI input of the MPU 26. Consequently, the application program will again be interrupted and, at 131 and 132 in FIG. 2, the entire status of the MPU 26 will again be stored in the portion 126 of the main memory 16. Then, at 133, the MPU will determine that the interrupt was caused by a change on line 32 which actuated line 43, and will thus proceed at 136 to block 146. It should be noted that, if it had been determined in block 141 that the DRQ bit was not set, or in other words that the hard disk drive 17 was not in the middle of an operation, control would have been transferred at 147 directly from block 141 to block 146. In either case, at block 146 the MPU 26 uses the address, control and data buses 51-53 to load a SUSPEND command into the register 86 of the hard disk drive 17. The response of the hard disk drive to this command will be described in more detail later, but in general this command notifies it that the system 10 will be entering suspend mode, and causes it to formulate in the RAM 116 a 512 byte block of data which contains every facet of its current status, including all registers and flags. Meanwhile, the MPU 26 has proceeded to block 147 in FIG. 2, where it uses the address, control and data buses 51-53 to load a REQUEST command into the register 86. In a manner described in more detail later, this causes the microprocessor 71 to successively send all 512 bytes of the data block it has formulated in the RAM 116 through the register 81 to the MPU 26. Meanwhile, at block 148 in FIG. 2, the MPU 26 accepts this 512 byte data block, and stores it in a reserved section of the main memory 16. Then, at 149, the MPU 26 deactuates the PWRCTL line 47, so that the electronic power switch 23 is disabled and shuts off all power to the hard disk drive 17. At this point, the MPU could also power down other peripherals present in the system. Then, at 151 in FIG. 2, the MPU 26 executes the software instruction which causes it to enter the suspend mode, in which it halts and internally shuts off power to substantially all portions of its circuitry.

At this point, power will have been shut off to substantially the entire system, except for the main memory 16, which must be maintained because it contains all of the stored status of the CPU 11 and hard disk drive 17, as well as portions of the operating system and any application programs which were active. Also, and as mentioned previously, a few small portions of the MPU 26 still receive power and remain active, including the portion which supplies refresh control signals at 56 to the main memory 16, and the portion which monitors the switch 12 so that, when the switch 12 is deactuated, the MPU 26 can be automatically brought out of suspend mode. So long as suspend mode is in effect, the MPU 26 remains halted at block 151 in FIG. 2.

Manual deactuation of the push-button switch 12 is treated differently by the MPU 26 than actuation thereof. In particular, where actuation of the switch 12 produces a service management interrupt, deactuation does not produce another interrupt. Instead, deactuation of the switch 12 causes the MPU 26 to automatically restore internal power to itself, to then set the special internal status bit shown diagrammatically at 128 in FIG. 1, and to then initiate a self-reset which does not affect the status bit 128 but which forces the MPU 26 into real mode and causes the MPU 26 to transfer control at 153 to a block 154. Block 154 is the start of a software routine which can also be entered at 155 in response to a power-up reset. At block 154, the software checks the status bit 128 and other similar indicators in order to determine the cause of the reset. In the event the status bit 128 is set, block 154 would be exited at 157. If the status bit were not set, control would be transferred as shown diagrammatically at 161-164 to one or more other routines which are not pertinent to the present invention and are thus not illustrated and described.

The transfer at 157 to block 166 represents a branch from the software reset handling routine to the special interrupt handling routine in the portion 126 of main memory 16. At block 166, the MPU 26 deactuates the signal PWRCTL on line 47 so that the electronic power switch 23 again supplies power to the hard disk drive 17. At this point, the MPU 26 would also turn on power to other not-illustrated peripherals which may be present, such as a display and/or a floppy disk drive. Then, at block 167, the MPU 26 uses the address, control and data buses 51-53 to load a RESTORE command into the register 86 of the hard disk drive 17, to indicate to the hard disk drive 17 that it will be receiving a block of 512 bytes to use in restoring its status. Then, the MPU 26 retrieves from the main memory 16 the 512 byte data block stored there at block 148 of FIG. 2, and successively transmits these 512 bytes across the data bus 53 and through the register 87 to the microprocessor 71. After receiving this entire data block, the microprocessor 71 restores the status of the hard disk drive 17 from the information in the data block, so that the hard disk drive 17 is now in precisely the state it was in before it lost power. In FIG. 2, the hardware of the MPU 26 automatically restores at 169 the complete status of the MPU 26 which has been stored in the management portion 126 of the main memory 16, and of course the interrupted application program is still resident in the main memory 16, along with all other programs which are active. Thus, at 171, the application program resumes executing without any knowledge that the system has been substantially shut down and restarted. The application program continues as if it has never been interrupted in the first place.

Figure 3:
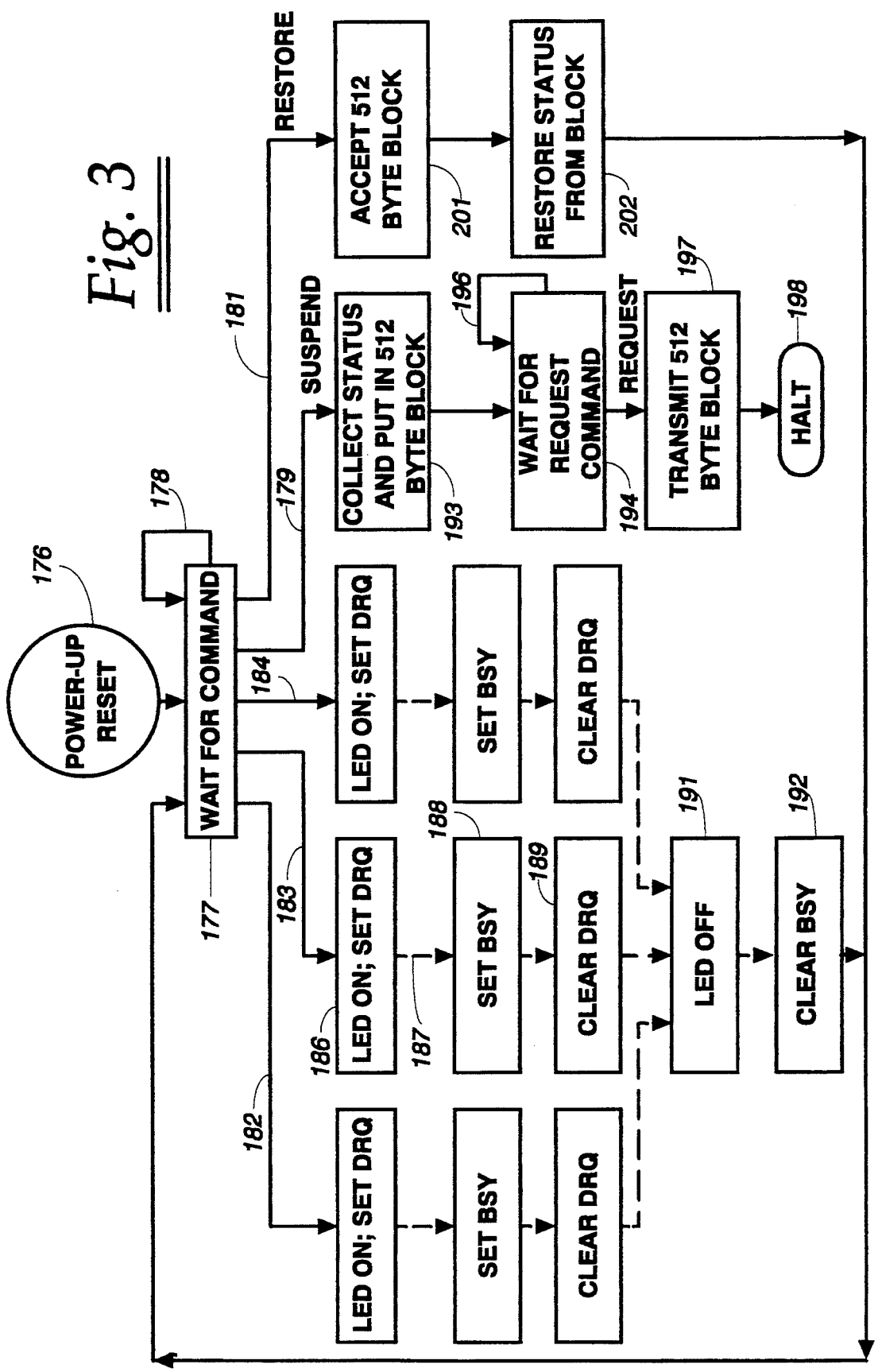
FIG. 3 is a flowchart of pertinent portions of a program executed by a microprocessor in the hard disk drive of FIG. 1.

FIG. 3 is a flowchart showing portions of the program which is stored in the ROM 112 of FIG. 1 and which is executed by the microprocessor 71 of hard disk drive 17 during the foregoing procedure. A power-up reset situation causes execution to start at 176, and to proceed to 177 where, as shown diagrammatically at 178, the microprocessor 71 waits for the CPU 11 to load a command into the register 86. When a command is loaded into the register, control proceeds to one of several different routines in dependence on the specific command. In particular, if the command is a SUSPEND command or a RESTORE command, control proceeds as shown respectively at 179 and 181, whereas other commands which are conventional cause control to proceed along respective paths designated at 182, 183 and 184. For purposes of the present invention, it is sufficient to briefly describe one of these other commands, for example the command corresponding to a transfer at 183 to block 186. This might, for example, be a command instructing the hard disk drive 17 to accept a block of data from the CPU 11 and to store this data on the hard disk of the physical drive section 121. At 186, the microprocessor 71 sets the line 32 to a logic low level in order to turn the LED 72 on, the LED providing visual indication that the hard disk drive is carrying out an operation. Then, the microprocessor 71 loads the status register 82 with a word which has the effect of setting the DRQ bit, so that if the MPU 26 reads the register 82 the DRQ bit will indicate that the hard disk drive 17 is carrying out an operation. Then, as indicated diagrammatically by the broken line at 187, the microprocessor 71 carries out the specific steps necessary to carry out the command.

For example, in the case of a transfer of a block of data from the MPU 26 to the hard disk in the physical drive 121, the microprocessor 71 can toggle the busy bit BSY 92 in the register 82 to provide an indication of when it is ready to accept each byte, and the MPU 26 can monitor the BSY bit and load an additional byte into the register 87 each time the BSY bit is cleared. The microprocessor 71 initially stores these received bytes in the RAM 116. After a predetermined number of bytes have been transferred, which may for example be equal to the number of bytes in a sector of the hard disk, the MPU 26 may return to other processing while the microprocessor 71 retrieves these bytes from the RAM 11.6 and stores them on the hard disk in the physical drive section 121. Then, the microprocessor 71 can send an HDINT signal on the line 46 in order to interrupt the MPU 26, causing the MPU 26 to send another portion of the data block which is to be stored. This is all represented diagrammatically in FIG. 3 by the broken line 187.

Toward the end of execution of the command, microprocessor 71 reaches a point at block 188 where it sets the BSY bit 92 in the register 82 for the last time, for example where it has accepted from the MPU 26 the very last byte to be stored. It then proceeds to store this information on the hard disk in the physical drive section 121 and to do any associated final housekeeping, and at some point during this process it clears the DRQ bit 91 in the status register 82, and at block 191 changes the line 32 to a logic high level to the turn the LED 72 off. Thereafter, at 192, the microprocessor 71 clears the BSY bit 92 in the register 82. It is a requirement of the present invention that, at the completion of a command, the LED 72 be turned off before the BSY bit in the register 82 is cleared, for the following reason.

As described above, when the system 10 is attempting to enter the suspend mode in response to actuation of the push-button switch 12, the MPU 26 checks the DRQ bit at block 141 in FIG. 2. If the microprocessor 71 is in the middle of a command, for example at 187 in FIG. 3, the DRQ bit will be set, and thus as described above in association with block 142-144 of FIG. 2, the MPU 26 will enable the line 33 in FIG. 1 and then return control to the application program to wait for the hard disk drive 17 to complete what it is doing. It is important that the application program not be able to instruct the hard disk drive 17 to start a new command. So long as the BSY bit is set, the application program which the MPU 26 is executing will not try to send the hard disk drive 17 a new command. Further, as also described above, when the microprocessor 71 turns off the LED 72 using line 32, the same signal will propogate through gates 36 and 38 to create another service management interrupt which returns control of the MPU 26 to the service management interrupt routine of FIG. 2, at which point the application program no longer has control of the MPU 26 and thus cannot tell the hard disk drive 17 to begin a new command. Therefore, with reference to blocks 191 and 192 in FIG. 3, keeping the BSY bit set at the end of the command until the LED 72 is turned off ensures that the BSY bit will keep the application program from starting a new command until the deactuation of the LED occurs and creates an interrupt which shifts control of the MPU 26 from the application program to the interrupt handling routine, which can then proceed with the suspend operation.

At this point, the interrupt handling routine would proceed to block 146 in FIG. 2 where, as described above, the MPU 26 sends the hard disk drive 17 a SUSPEND command. In FIG. 3, this causes the microprocessor 71 to proceed at 179 from block 177 to block 193, where it collects every facet of its current status and formulates in the RAM 116 a 512 byte block of data which includes all of this status. The status may take up only a portion of the 512 available bytes, and the remaining bytes can in fact be "garbage". Then, at block 194, the microprocessor waits for a request command from the MPU 26, as shown diagrammatically at 196. Meanwhile, MPU 26 proceeds from block 146 to block 147 in FIG. 2, where it sends the REQUEST command. In response to the REQUEST command, the microprocessor 71 proceeds from block 194 in FIG. 3 to block 197, where it transmits through the register 81 to the MPU 26 the 512 byte block of data it has formulated in the RAM 116. Then, at block 198, the microprocessor 71 halts, and waits for the MPU 26 to use the electronic power switch 23 to shut off power to the hard disk drive 17 in the manner already described above.

When the MPU 26 eventually exits from the suspend mode, it will use the electronic power switch 23 to turn the power to the hard disk drive 17 back on, as discussed above in association with block 166 in FIG. 2. In FIG. 3, this produces a power-up reset event which forces the microprocessor 71 to block 176 in FIG. 3, following which the microprocessor 71, typically after doing some initialization, proceeds to block 177, where it waits at 178 for a command from the MPU 26. Meanwhile, the MPU 26 proceeds to block 167 in FIG. 2, where it loads the RESTORE command into the register 86 of the hard disk drive 17. This causes the microprocessor 71 to proceed at 181 from the block 177 to the block 201, where it accepts the 512 byte block which the MPU 26 is transmitting in block 168. This is, of course, precisely the 512 byte block which the microprocessor 71 sent to the MPU at block 197, and thus at block 202 the microprocessor 71 can use the data in this block to completely restore every facet of the status which was present in hard disk drive 17 before its power was turned off.

Figure 4:
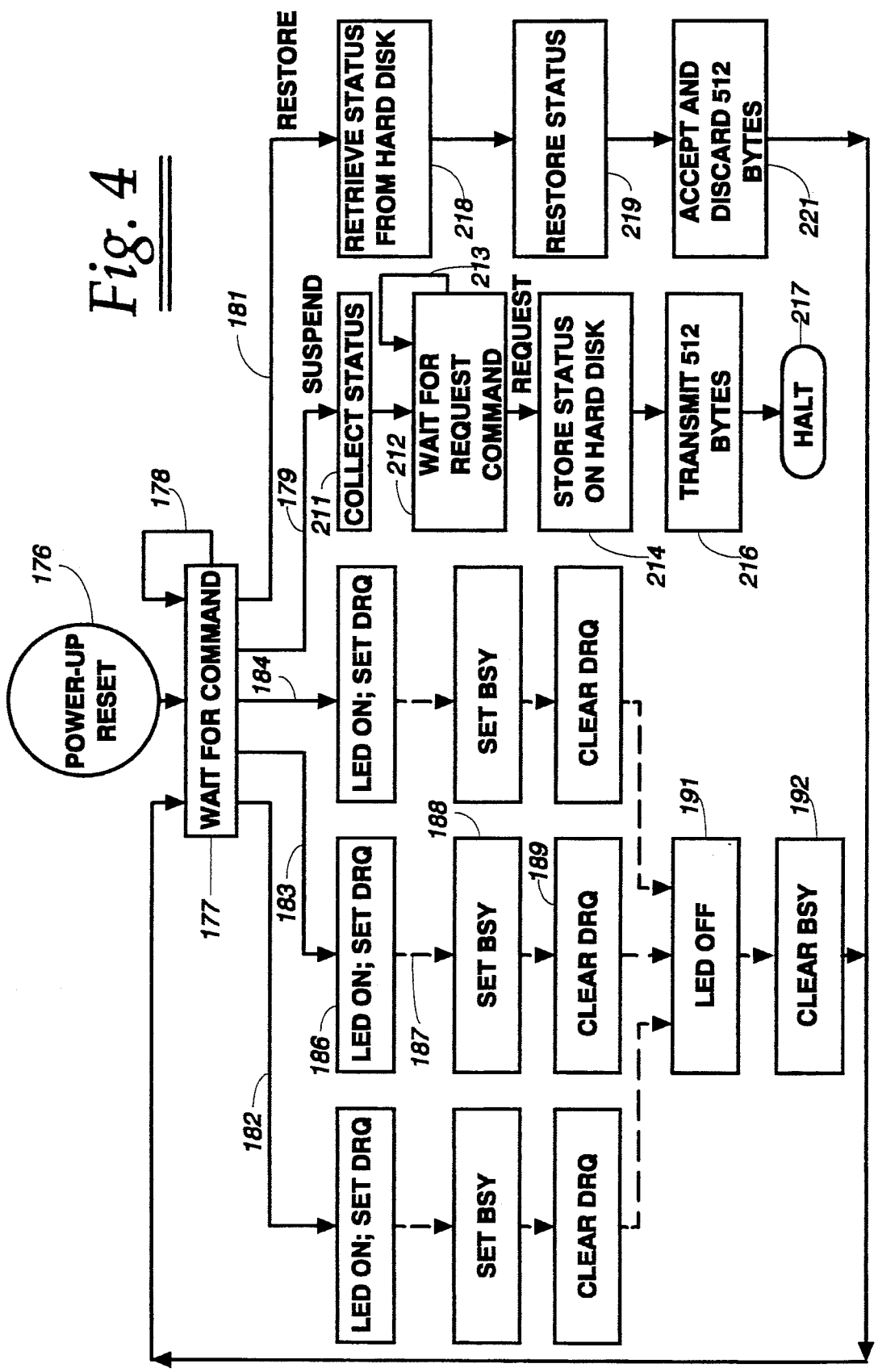
FIG. 4 is a flowchart of an alternative embodiment of the program represented by the flowchart of FIG. 3.

FIG. 4 is a flowchart showing an alternative embodiment of the program of FIG. 3. Equivalent elements in FIGS. 3 and 4 are designated with identical reference numerals. Only the differences are described in detail below.

More specifically, in response to the SUSPEND command, the microprocessor 71 proceeds at 179 from block 177 to block 211 of FIG. 4. In block 211, the microprocessor collects every facet of its status. Then, in block 212, the microprocessor 71 waits for the REQUEST command from the MPU 26, as shown diagrammatically at 213. When the REQUEST command is received, the microprocessor 71 proceeds to block 214, where it stores the collected status on a reserved portion of the hard disk in its own physical drive section 121. Then, at block 216, it transmits 512 bytes to the MPU 26. These 512 bytes may be undefined "garbage" data, and are transmitted only for purposes of compatibility because the MPU 26 expects to receive and store 512 bytes. Then, the microprocessor 71 halts at 217 and waits for its power to be turned off.

After power is turned back on, the microprocessor 71 receives the RESTORE command from the MPU 26, and proceeds at 181 from block 177 to block 218, where it retrieves the status information which it stored on the hard disk in block 214, and then restores from this stored data at block 219 every facet of the status which the hard disk drive 17 had before its power was turned off. Then, at block 221, it accepts the 512 bytes which the MPU 26 sends, but it simply discards this data because it has no need for it.

Figure 5:
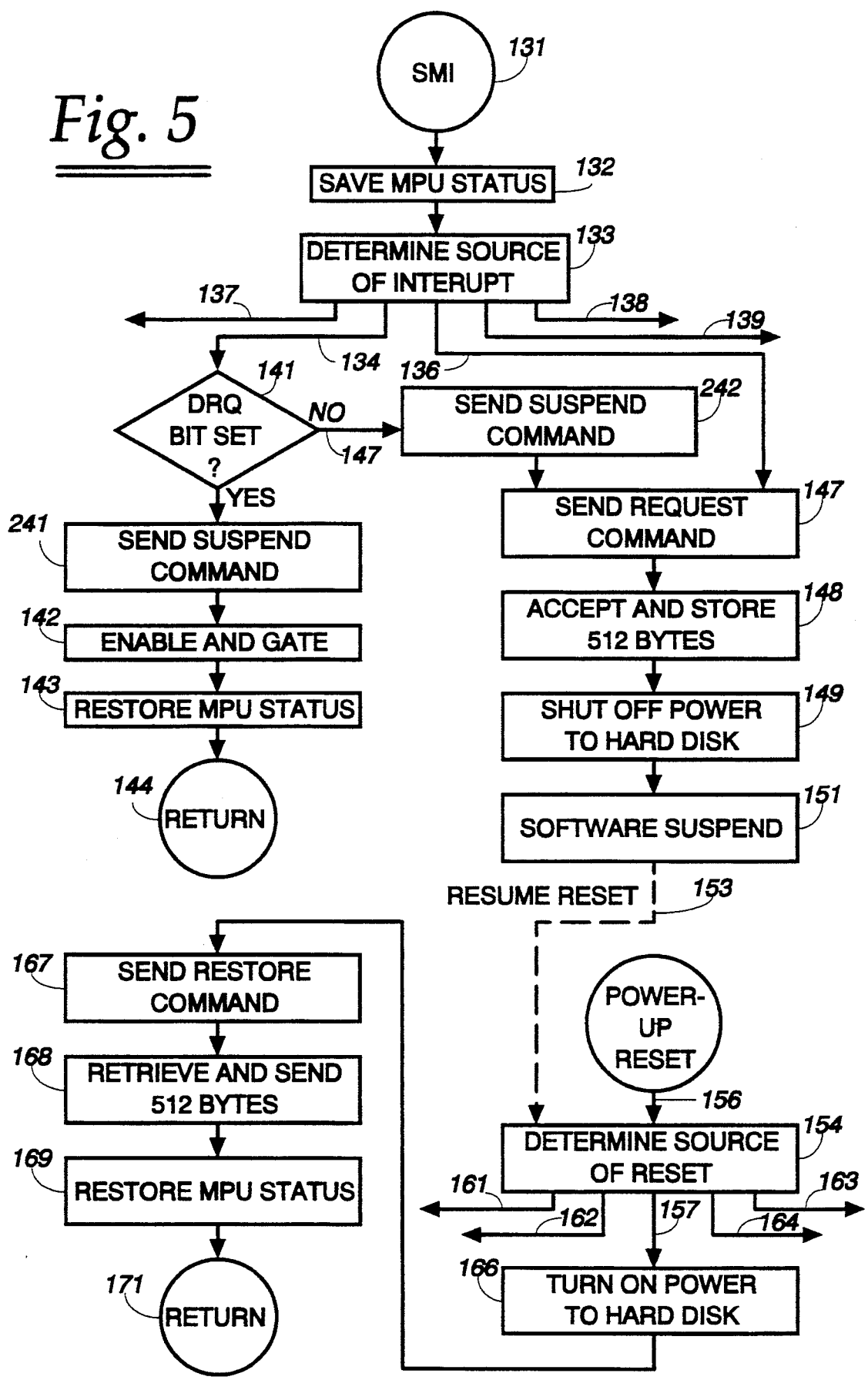
FIG. 5 and 6 are flow charts respectively similar to FIGS. 2 and 3 but showing another alternative embodiment of the invention.
Figure 6A:
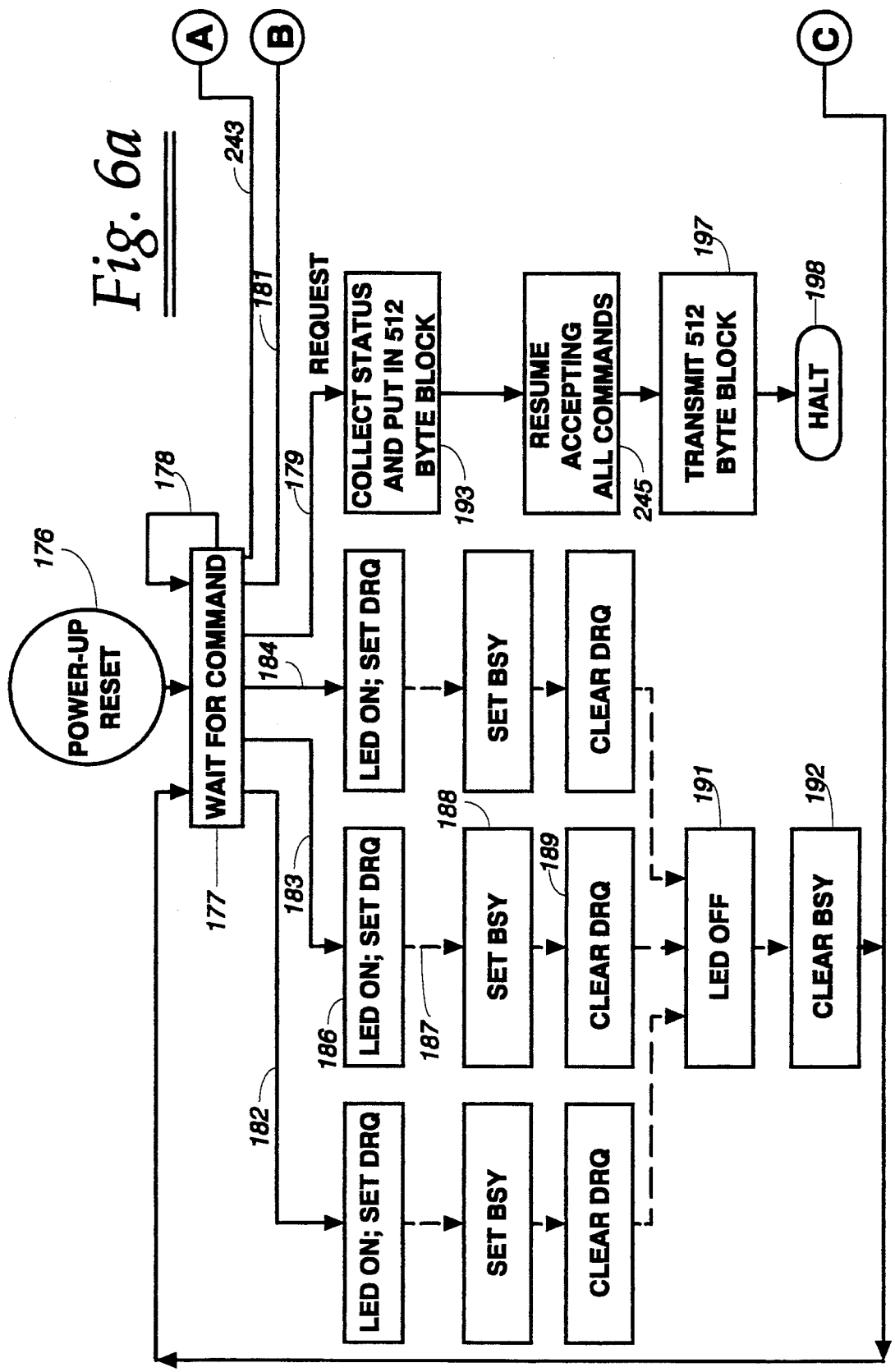

FIGS. 5 and 6 are flow charts which are respectively similar to FIGS. 2 and 3 but show another alternative embodiment of the invention. Elements in FIGS. 5 and 6 which are equivalent to elements in FIGS. 2 and 3 are designated with the same reference numerals used in FIGS. 2 and 3. Only the differences are described in detail below.

More specifically, in the embodiment of FIGS. 2 and 3, it is a requirement that the hard disk control its LED line in a specific manner, in particular by promptly deactuating it as soon as the current command has been completed. There are some disk drives which may have difficulty with this approach, but on the other hand it is possible to send these drives a command while they are in the process of executing another command. Thus, in FIG. 5, regardless of whether it is determined in block 141 of FIG. 5 that the DRQ bit is set, a SUSPEND command is immediately sent to the disk drive at 241 or 242. In the event the drive is busy and the system has to wait for it to finish what it is doing and then service another SMI, when control proceeds along arrow 136 it will not be necessary to send the SUSPEND command again.

In FIG. 6, receipt of the SUSPEND command causes control to proceed at 243 to block 244, where the disk drive enters a mode where it stops accepting further commands other than the REQUEST command. While waiting for the REQUEST command, the drive completes the activity which is already in progress. Then it deactuates its LED line in order to indicate that at some point the activity has been completed, after which the processor sends the REQUEST command. In response to the REQUEST command, the disk drive formulates the 512 byte block at 193, then resumes accepting all commands at block 245, and then at block 197 transmits the 512 byte block to the processor.

Preferred embodiments of the invention have been disclosed and described in detail, but it will be recognized that there are variations or modifications of the disclosed embodiments which lie within the scope of the present invention.

The embodiments of the invention in which an exclusive property or privilege is claimed are defined as follows:

1. An apparatus comprising: a processor having an interrupt input; a disk drive having means for outputting a light element control signal which can have first and second states respectively indicating that said disk drive is active and inactive; and selectively actuable means for respectively effecting and preventing application of said light element control signal from said disk drive to said interrupt input of said processor when said selectively actuable means is respectively actuated and deactuated, said processor including means for selectively actuating and deactuating said selectively actuable means.

2. An apparatus of claim 1, wherein said processor has a selectively actuable output; and wherein said selectively actuable means includes an AND gate having one input coupled to said output of said processor and a second input coupled to said light element control signal from said disk drive, and means coupling said output of said AND gate to said interrupt input of said processor.

3. An apparatus of claim 1, including a cable coupled to said disk drive and having a plurality of conductors, one of said conductors carrying said light element control signal from said disk drive and being connected at an end of said cable remote from said disk to said selectively actuable means.

4. An apparatus according to claim 1, including light emitting means for respectively emitting and not emitting visible light when said light element control signal respectively has said first and second states.

5. A method of operating a system which includes a processor having an interrupt input and includes a disk drive outputting a light element control signal which can have first and second states, including the steps of: checking for the presence of a predetermined operational condition; monitoring said light element control signal when said predetermined operational condition is present to detect a change from said first state to said second state thereof; and interrupting said processor in response to detection of a change in said light element control signal from said first state to said second state when said predetermined operational condition is present.

6. A method of claim 5, including the step of executing a program in said processor which selectively changes an output signal from said processor between first and second logical states, said checking step including the steps of monitoring said output signal from said processor and determining that said predetermined operational condition is present when said output signal has said first logical state.

7. A method of claim 5, wherein said system includes a light emitting element, and including a step of energizing said light emitting element so that it emits visible light when said light element control signal has said first state, and deenergizing said light emitting element to prevent emission of light therefrom when said light element control signal has said second state.

* * * * *